Oct. 26, 1965 H. W. COLE, JR 3,213,974
AUTOMATIC WHEEL LOCK TOW BAR OPERATED RELEASE
Filed May 16, 1963 3 Sheets-Sheet 1
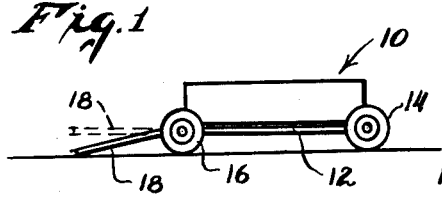
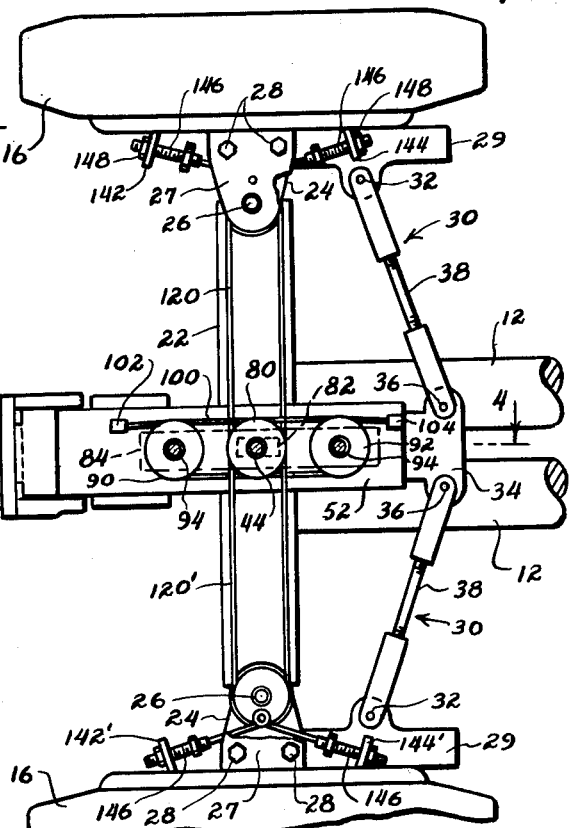
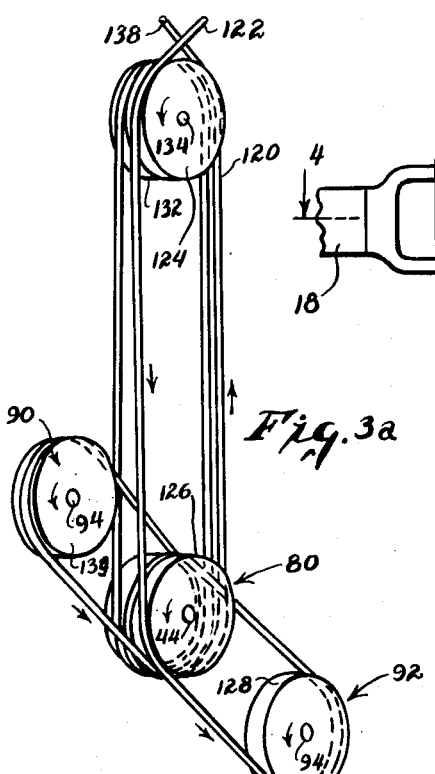
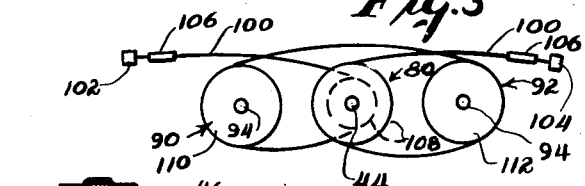
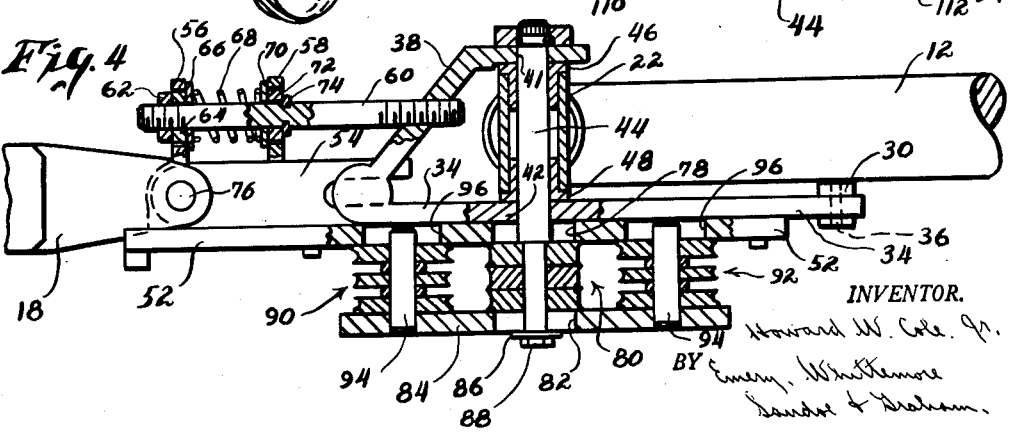
INVENTOR.
Howard W. Cole, Jr.
BY Emery, Whittemore, Sandoe & Graham
ATTORNEYS

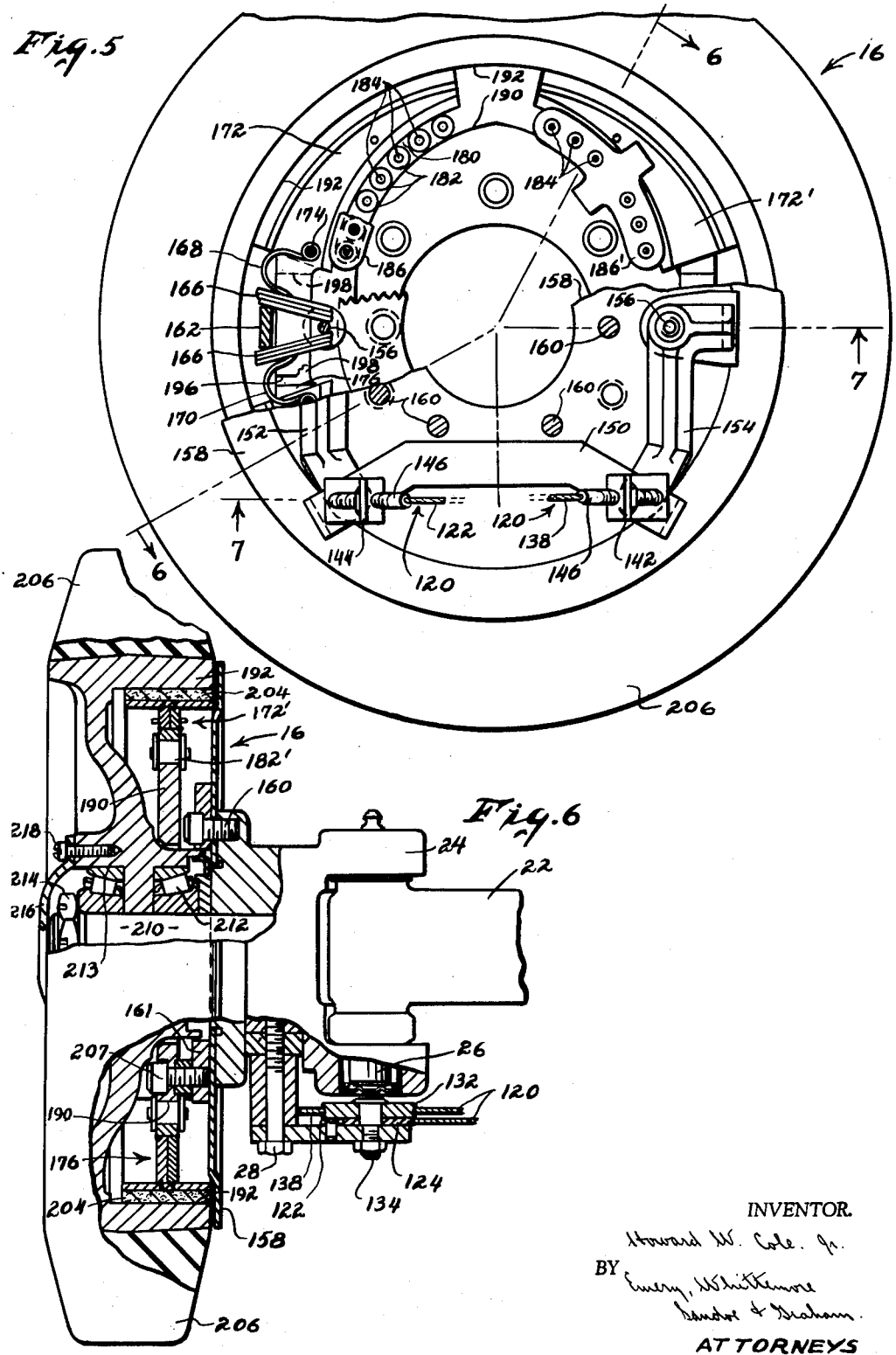

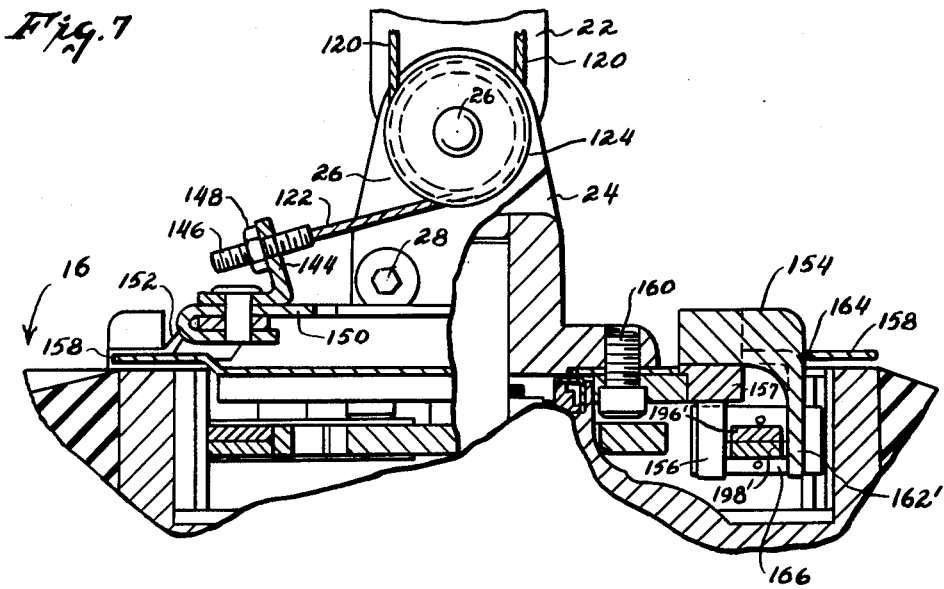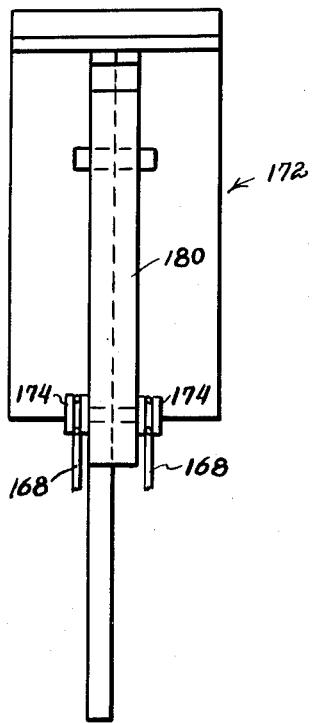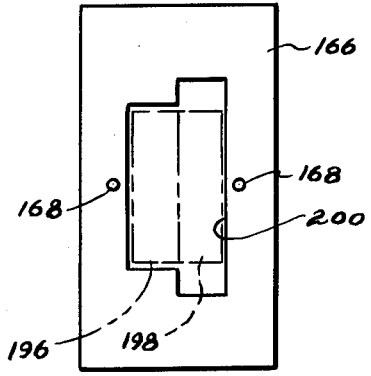

United States Patent Office 3,213,974
Patented Oct. 26, 1965

3,213,974
AUTOMATIC WHEEL LOCK TOW BAR
OPERATED RELEASE
Howard W. Cole, Jr., 12 Vale Drive,
Mountain Lakes, N.J.
Filed May 16, 1963, Ser. No. 280,851
13 Claims. (Cl. 188—142)

This invention relates to apparatus for locking a wheel, such as a vehicle wheel, against turning, the lock being applied automatically and being released only when force is exerted against unlocking levers, or other means, as a part of an operation by which the vehicle may be pushed or pulled to move it to a new location.

It is an objection of the invention to provide an improved automatic wheel lock in which a brake having shoes, and preferably brake lining on the shoes, exerts pressure against a drum of a wheel to stop the wheel and to hold it locked against rotation. The brake is applied automatically and regeneratively in both directions and at all times except when force is applied to and maintained against release mechanism. In the preferred construction, this force is applied by a tow bar having some lost motion in its connection to the vehicle.

This invention includes cam means that displace brake shoes against a drum when the drum and wheel turn in one direction, and the cam means is similar in construction to a free-wheeling or over-running clutch when the drum rotates in the other direction. There are two such cam means, or groups of cam means, for the drum, and each of the cam means is turned in an opposite direction so that one or the other of them applies the brake no matter which way the drum turns.

Another object of the invention is to provide improved operating mechanism for releasing the brakes on the wheels of a vehicle regardless of the positions to which the wheels may be turned at the time to steer the vehicle; and to obtain a mechanical advantage for the tow bar in its exertion of force to move the automatic brake release.

The invention has many applications, including the locking of brakes on wheeled apparatus which is used on the decks of aircraft carriers, or other ships, where pitching and rolling of the ship changes the slope of the deck in various directions that would result in rolling of the apparatus on the deck, were it not for the automatic locking of the wheels.

Other objects, features and advantages of the invention will appear or be pointed out as the description proceeds.

In the drawing, forming a part hereof, in which like reference characters indicate corresponding views in all the parts:

FIGURE 1 is a diagrammatic side elevation of a carriage having wheels and a tow bar combined with wheel locking apparatus made in accordance with this invention;

FIGURE 2 is a greatly enlarged bottom view of the front wheels and axle and the adjacent parts of the carriage shown is FIGURE 1;

FIGURE 3 is a diagrammatic view showing part of the control mechanism of the carriage; FIGURE 3a is a diagrammatic view showing other parts of the control mechanism for releasing the locking brakes;

FIGURE 4 is an enlarged, sectional view taken on the line 4—4 of FIGURE 2;

FIGURE 5 is a greatly enlarged view, partly broken away and in section showing the locking brakes for one of the wheels and parts of the operating mechanism;

FIGURE 6 is a fragmentary view, partly broken away and in section, the section being taken on the line 6—6 of FIGURE 5;

FIGURE 7 is a fragmentary view, partly broken away and in section, the section being taken on the line 7—7 of FIGURE 5;

FIGURE 8 is a detailed view, on a reduced scale, showing one of the brake shoe assemblies of FIGURES 5–7 on a reduced scale; and FIGURE 9 is a detailed view showing one of the clips used in the operating mechanism illustrated in FIGURES 5–7.

FIGURE 1 shows a carriage 10 having a frame 12 supported by rear wheels 14 and front wheels 16. The carriage 10 is pulled by a tow bar 18 which leaves the front wheels locked against rotation in either direction when the tow bar 18 is resting on the floor or ground in the full line position shown in FIGURE 1. This tow bar 18 can be lifted at one end into various positions as is most convenient for the person or vehicle that is to move the carriage, and when the tow bar is lifted it has no affect upon the application of the brake unless it is either pulled or pushed to move the carriage forward or rearward.

FIGURES 2 and 6 show the way in which the front wheels 16 are connected with the carriage. There is a front axle 22 which forms part of the frame 12; and this axle is rigidly connected with the rest of the frame. Each of the wheels is pivotally connected with the front axle 22 by a steering knuckle 24 which is pivotally connected to the axle by a king pin 26. There is a plate 27 located under each steering knuckle 24 and attached to the knuckle by screws 28. The steering knuckles have rearward extensions 29 connected to tie rods 30 by pivot pins 32. The other ends of the tie rods 30 are pivotally connected with a steering frame 34 by pins 36. Sections 38 of the tie rods 30 have right and left hand threads at their opposite ends and these sections screw into the end parts of the tie rods to adjust the tire rod lengths in accordance with conventional automotive practice.

The frame 34 extends under the axle 22 and has an upwardly extending portion 38 (FIGURE 4) that extends across the top of the axle. There are bearing surfaces 41 and 42 of the frame 34 through which a steering pin 44 extends; and there are thrust bearings 46 and 48 along the steering pin 44 in position to prevent vertical movement of the frame 34 with respect to the axle 22.

There is a slide plate 52 immediately under the frame 34 and there is a bracket 54 secured to the forward end of the slide plate 52. There are two lugs 56 and 58 extending upwardly from the bracket 54 and integral therewith. A bar 60 extends through the lugs 56 and 58 and threads into the upwardly extending portion 38 of the frame 34.

At the end of the bar 60, remote from the frame 34, there is a nut 62 threaded on the bar. There is a collar 64 on the bar 60 next to the nut 62 and this collar has a sliding fit in a cylindrical bearing surface of the lug 56. Beyond the collar 64 there is a washer 66 which is larger than the cylindrical bearing opening in which the collar 64 slides. The washer 66 is held against the lug 56 by a compression spring 68.

At its rearward end, the spring 68 holds another washer 70 against the lug 58. A collar 72, of smaller diameter than the washer 70, has a sliding fit in a cylindrical bearing surface in the lug 58 and there is a snap ring 74 in a circumferential groove in the bar 60 just beyond the collar 72.

The slide plate 52 and its integral bracket 54 are free to slide within a limited range in a direction parallel to the axis of the bar 60. The mounting which makes this sliding movement possible will be explained hereafter. The purpose of the lugs 56 and 58, the spring 68 and the various elements on the bar 60 are for urging the slide plate 52 into a center position. With the parts in the-positions shown in FIGURE 4, the plate 52 is in its mid or center position.

The tow bar 18 is attached to the bracket 54 by a horizontal pin 76 and the tow bar can swing about the axis of the pin 76 into raised and lowered positions. When the tow bar is pulled toward the left in FIGURE 4, the bracket 54 and both of its lugs 56 and 58 are moved axially toward the left along the bar 60. The lug 56 moves to the left while the nut 62, collar 64 and washers 66 remain stationary. The lug 58 moves with respect to the stationary snap ring 74. The collar 72 can move toward the left with the lug 58 or can remain stationary, depending upon the relative friction of the collar on the bar 60 and in the lug 58; but the lug 58 will move the washer 70 toward the left and compress the spring 68 against the washer 66 at the other end of the spring. Conversely, any pushing of the tow bar 18 toward the right moves the lugs 56 and 58 toward the right and causes the lug 56 to move the washer 66 to compress the spring 68 against the washer 70 which cannot move because of the collar 72 and snap ring 74. Thus movement of the tow bar 18 either forward or rearward causes compression of the spring 68; and this spring, therefore, tends to hold the tow bar 18, bracket 54 and slide plate 52 in their mid or center positions.

The steering pin 44 extends through an opening 78 in the slide plate 52 and then through a group of pulleys, designated generally by the reference character 80, and then through an opening 82 in a bottom plate 84. The openings 78 and 82 are slots and they are longer than the diameter of the pin 44, but their width is substantially equal to the pin diameter. The slide plate 52 and the bottom plate 84 are supported by a washer 86 and a nut or bolt head 88 of the pin 44 located under the washer 78. This support for the slide plate 52 and the bottom plate 84 leaves both of these plates free to move fore and aft on pin 44 and also leaves them free to turn about the vertical axis of the pin 44 when the carriage is to turn a curve.

The group of pulleys 80 is free to turn on the pin 44 as an axle but it cannot move fore and aft with the plates 52 and 84. There are two other groups of pulleys 90 and 92 supported from the bottom plate 84 by studs 94 rigidly connected to the bottom plate 84 and extending upwardly therefrom. The upper ends of the studs 90 and 92 extend into slots 96 in the slide plate 52. This gives the bottom plate sliding movement independent of the slide plate 522, but the width of the slots 96 is substantially equal to the diameters of the studs 94 so that the studs keep the plate 84 in line with the plate 52 in a fore-and-aft direction. All of the pulleys of the pulley groups 80, 90 and 92 are free to rotate independently of one another.

The pulleys of the groups 80, 90 and 92 include three different pulley systems, each of these systems includes one pulley of each of the groups 90 and 92 and one pulley of the center group 80; but the pulleys of the center group 80 are twice as wide as the pulleys of the groups 90 and 92 and are preferably not grooved. In other words, the pulleys of the group 80 are, in effect, drums without grooved faces. The cables used with the pulleys are omitted in FIGURE 4 for clearer illustration. The upper pulley system is illustrated diagrammatically in FIGURE 3 with the cables shown loose so as to make clear the particular arcs of the pulleys about which each run of cable extends, and the upper portion of the pulley on the center group 80 is shown with a reduced diameter so as to further clarify the drawing, so it should be understood that actually the pulley or drum of the center group is of uniform diameter throughout its full height.

The top pulley system shown in FIGURE 3 has a cable 100 connected at one end to an anchor 102 which is secured to the slide plate 52 (FIGURE 4). The other end of the cable 100 is connected with an anchor 104 secured to the slide plate 52 near the rear end thereof.

There are adjustable means, such as turnbuckles 106 (FIGURE 3) for taking up slack in the cable 100.

From the forward anchor 102, the cable 100 passes to the top drum or pulley 108 of the center group 80, around a substantially 180 degree arc of the pulley 108 and then to a pulley 110 which is the top pulley of the group 90. After passing around about 180 degrees of arc of this pulley 110, the cable 100 passes rearwardly to a pulley 112 of the pulley group 92, around this pulley 112 and forward to the pulley 108 of the center group 80 after passing around substantially 180 degrees of arc of this center pulley 108, the cable passes to the rearward anchor 104.

Referring again to FIGURE 4, it will be apparent that the plate 52 and the anchors 102 and 104 move one way or the other when the tow bar 18 is moved, and depending upon whether the tow bar is moved forwardly or rearwardly. The pulleys of the center group 80 cannot move forward or aft because they are on the center pin 44, and the bottom plate 84 and the pulley groups 90 and 92 move only as required by the movement of the cable when the anchors 102 and 104 move.

Whenever the forward anchor 102 moves toward the left in FIGURE 3, the cable 100 rotates the pulley 108 and this causes the cable 100 to exert a rearward pull on the pulley 110. Any rearward movement of the pulley 110 moves its stud axle 94 rearwardly and this shifts the plate 84 (FIGURE 4) rearwardly and with it the stud axle 94 of the rear pulley group 92.

This rearward movement of the pulley group 92 moves the pulley 112 in a direction to prevent any slack from developing in the run of cable 100 between the pulleys 110 and 112. The actual effect of the system illustrated in FIGURE 3a is for the axle 94 and the plate 84 to which the axles 94 are connected to move rearwardly by a distance equal to approximately one-third of the distance that the tow bar and anchors 102 and 104 and has no effect upon the pulley system of FIGURE 3 because of its symmetry about the pin 44 which is the center of location.

FIGURE 3a is a diagrammatic view of the second pulley system. This system includes a mid pulley of each of the groups 80, 90 and 92. For clearer illustration, no attempt is made in FIGURE 3a to show any of the pulleys as grooved. A cable 120 extends from one of its ends 122 around a short arc of a pulley 124, then around about 90 degrees of arc of a drum or pulley 126 of the pulley group 80, and to a pulley 128 of the pulley group 92.

After passing around substantially 180 degrees of arc of the pulley 128, the cable 120 extends forward and around about 270 degrees of arc of the drum or pulley 126 and then out to a pulley 132 located on a common axle 134 with the pulley 124, around about 180 degrees of arc of this pulley 132 and back to the drum 126. The cable 100 then passes around this drum or pulley 126 and then forward to a pulley 135 of the pulley group 90, around this pulley 135 and then rearward and again around an arc of the center drum or pulley 126 and out again to the pulley 124 and to the other end 138 of the cable.

The ends 122 and 138 of the cable are attached to brake release mechanism which will be described. The pulleys 124 and 132 have the axle 134 in line with the king pin on which the carriage steers. For the present it is sufficient to understand that turning of the carriage wheels to steer does not shift the axle 134 transversely and does not move the center steering pin 44. The system of pulleys and the runs of the cable 120 shown in FIGURE 3a permit the carriage to be steered without pulling on either of the ends 122 or 138 of the cable 120. Thus the steering does not affect operation of the brake release levers that are connected with the cable 120 at the ends 122 and 138.

When the tow bar 18 is moved forwardly or rearwardly to shift the stud axles 94, then the movement of the pulleys 128 and 135 pulls the cable 120 one way or the other, depending upon the direction of movement of the tow bar, and this releases brake locks on the wheels by pulling the end 122 or the end 138 of the cable 120.

Although FIGURE 3a shows the pulley system for releasing the brake lock on the wheel on only one side of the carriage, it will be understood that the lowermost pulleys of the pulley groups 80, 90 and 92 are combined with a similar cable to make up a system which is like that shown in FIGURE 3a, but for the wheel on the other side of the carriage. The corresponding parts of the system for the other side of the carriage are shown to some extent in FIGURE 2 and corresponding parts are designated by the same reference characters as in FIGURE 3a, but with a prime appended.

FIGURES 2 and 5 show the way in which the ends of the cables 120 and 120' are joined to lugs 142 and 144 of the right wheel assembly (top in FIGURE 2) and to lugs 142' and 144' for the left wheel assembly. There are connectors 146 secured to the cables 120 and 120' at the end of each cable and extending through openings in the lugs. These connectors 146 are threaded and on their other ends have nuts 148 which are turned one way or the other to take up slack in the cables and to impart any desired tension to the cables 120 and 120'.

The lugs 142 and 144 are at opposite ends of an operating link 150 which is connected near its ends with operating levers 152 and 154. Each of these levers 152 and 154 is supported on a pivot 156 which is fixed on a lug 157 on a flange 158 (FIGURES 5 and 6) attached to the steering knuckle 24 by screws 160 (FIGURE 7). The flange 158 is a composite construction with a reinforcing ring 161 at an annular zone on both sides of the circle of the screws 160. At the upper end of the operating lever 152 there is an operating tang 162 that extends through a slot 164 and the flange 158.

The tang 162 extends between two groups of clip plates 166. One group of these plates 166 is held against the top of the tang 162 by springs 168, and these springs also press the plates against a portion of the pivot 156. Other springs 170 press a lower group of clip plates 166 against the lower side of the tang 162 and against the lower side of the pivot 156. There are two springs 168, one on each side of a brake shoe assembly 172 (FIGURE 8) and these springs are connected at their fixed ends to the brake shoe assembly by connectors 174; and the springs 170 (FIGURE 5) are similarly connected to a downwardly extending brake shoe assembly 176 by connectors 178.

The brake shoe assembly 172 has a surface 180 (FIGURE 5) on its inner side in contact with a group of rollers 182. Each of the rollers 182 has an axle 184 which is held at its opposite ends by plates of a roller cage 186. The cage holds the axles 184 spaced from one another in a line along the surface 180 on the sides of the rollers 182 opposite the surface 180 of the brake shoe assembly, the rollers roll along the peripheral surface of a cam 190. The radius of this cam increases toward the top of the cam, as viewed in FIGURE 5. The springs 168 urge the brake shoe assembly 172 upward and this rolls the rollers 182 along the cam 180 until the increasing radius of the cam moves the brake shoe assembly 172 radially outward and into contact with a drum 192 of the wheel with such force as to prevent further displacement of the brake shoe assembly by the spring 168; the parts being shown in this position with the resistance of the brake pressure counterbalancing the force of the springs 168, in FIGURE 5.

If the wheel 16 starts to turn clockwise (FIGURE 5), friction of the drum 192 against the brake shoe assembly 172 urges the brake shoe assembly to move in a direction to roll the rollers 182 further up along the cam 190 with the result that the brake shoe assembly is forced against the drum 192 with progressively greater force to lock the wheel 16 against rotation.

If the wheel 16 starts to turn counterclockwise, the friction of the drum 192 against the brake shoe assembly 172 urges the brake shoe assembly and the rollers 182 in a direction where the cam radius is less and thus decreases the friction of the brake shoe assembly against the drum so as not to interfere with the rotation of the wheel 16.

Thus this brake structure for preventing rotation of the wheel 16 in a clockwise direction, while leaving it free to rotate in a counterclockwise direction, is similar in construction to a free-wheeling or "over-running clutch."

The wheel 16 is locked against counterclockwise rotation, however, by a second assembly similar in construction to an over-running clutch is oriented to operate in the opposite direction from the other brake structure. This second assembly includes the downwardly extending brake shoe assembly 176 which is the same as the brake shoe assembly 172 except that it is oriented in the opposite direction and, therefore, locks when the wheel 16 starts to turn in the opposite direction from that which engages the brake shoe assembly 172 with the drum. There are other brake shoe assemblies on the other side of the wheel, as viewed in FIGURE 5. The upwardly extending brake shoe assembly, and its associated parts, on the right of FIGURE 5 have corresponding parts designated by the same reference characters as on the left, but with a prime appended. The downwardly extending brake shoe assembly on the right in FIGURE 5 is covered by other structure in the drawing and does not show.

The brake shoe assembly 172 has an end portion 196 that extends through openings in all of the clip plates 166. Behind this end portion 196 in FIGURE 5, there is a similar end portion 198 extending upward from the downwardly extending brake shoe assembly 176. This end portion 198 also extends through openings in all of the clip plates 166 alongside of the end portion 196 of the upper brake shoe assembly.

FIGURE 9 shows one of the clip plates 166 with the end portions 196 and 198 shown in phantom. There is an opening 200 through which the end portions 196 and 198 extends; and the height of this opening 200 is greater than the height of either of the end portions 196 and 198 of the brake shoe assembly. However, if the clip plate 166 is tilted so that it extends at a smaller angle to the length of the end portions of the brake shoe assembly, this has the effect of making the opening 200 of less height so that edges of the opening 200 touch the end portion 196 or 198 and jam on it so that the end portion cannot move without moving the clip plate with it.

In FIGURE 9 the height of the opening 200 is less at the location where the end portion 196 passes through it than where the end portion 198 passes through it. Thus tilting of the plate 166 of FIGURE 9 will cause it to jam on the end portion 196 but not on the end portion 198. Referring to FIGURE 5, the lower clip plates 166 are oriented so that their opening jams these plates 166 on the end portion 196 when the tang 169 moves downward and rocks these lower plates counterclockwise in positions at smaller angles to the vertical length of the end portion 196.

Conversely, the upper plates 166 are oriented so that they jam only on the end portion 198 of the downwardly extending brake shoe assembly 176 when the tang 162 is moved upward to rock the upper clip plate 166 clockwise.

By thus operating the tang 162 one way or the other, to jam the end portions 196 and 198 so that their brake shoe assemblies cannot move in the direction necessary to lock the wheel, the wheel is left free to rotate. Thus downward movement of the tang 162 in FIGURE 5 unlocks the brake shoe assembly 172 and upward movement of the tang 162 unlocks the brake shoe assembly 176. The motion transmitting connections from the tow bar to the tang 162 are such that the tang releases the brake shoe assembly that needs to be released to permit the carriage to roll in the direction in which force has been applied to move the tow bar.

FIGURE 6 shows brake lining 204 which is part of the downwardly extending brake shoe assembly 176; this lining being bonded to the rest of the brake shoe assembly in accordance with conventional practice. Outside of the brake drum 192 there is a tire 206. In the illustrated wheel structure, the brake drum is the rim of the wheel but it will be understood that the invention can be used with other kinds of brake drums. The cam 190 is secured to the ring 161 of flange 158 by screws 207 and the ring 161 is attached to the steering knuckle 24 by the screws 160.

A wheel axle 210 extends from the steering knuckle 24 and there are roller bearings 212 between the axle 210 and bearings 213 of the wheel. A nut 214 threads on the end of the axle 210 to retain the inner races of the roller bearings 212 on the axle. A wheel hub 216 is attached to the wheel over the nut 212 by screws 218.

The preferred embodiment of the invention has been illustrated and described, but changes and modifications can be made, and some features can be used in different combinations without departing from the invention as defined in the claims.

What is claimed is:

1. A carriage having wheels by which it is supported, a tow bar at one end of the carriage, a connection between the tow bar and the carriage, means locking a wheel of the carriage against rotation, two lock release devices operably connected to the locking means of said wheel, an actuator including motion-transmitting connections between the tow bar and the lock release devices for operating different ones of said devices in response to forward or rearward force applied to the tow bar, an axle having steering knuckles at opposite ends thereof, each steering knuckle including a king pin by which a wheel is connected with the axle, a steering pin, the tow bar connection being angularly movable about the axis of the steering pin as a center, and the motion transmitting connections between the tow bar and the lock release devices having a portion centered in axial alignment with said king pin whereby turning of the steering knuckle on the king pin does not operate either of the lock release devices.

2. A carriage having wheels by which it is supported, a tow bar at one end of the carriage, a connection between the tow bar and the carriage, means locking a wheel of the carriage against rotation, a lock release device operably connected to the locking means, an actuator including motion-transmitting connections between the tow bar and the lock release device for operating said device in response to force applied to the tow bar, a pin about which a wheel of the carriage is movable axially to steer the carriage, a cable constituting at least a part of the connections between the tow bar and the lock release device, a pully system about which the cable passes, including at least one pulley having its axis of rotation substantially in axial alignment with the axis of the pin about which the wheel moves angularly to steer the carriage.

3. The carriage described in claim 2, characterized by two front wheels that turn angularly to steer the carriage, separate axles for the different front wheels, a different steering knuckle by which each of the axles is carried, locking means including separate means for locking each of the front wheels, and the lock release device including separate lock release means for each of the front wheels including a cable and pulley system leading from each wheel and operably connected with the actuator and the tow bar.

4. The carriage described in claim 3, characterized by a slide plate connected with the tow bar and having a lost motion connection with the carriage, and constituting the connection between the tow bar and the carriage, a center pin in fixed relation with the carriage and supporting the slide plate, the pulley system including a pulley carried by said center pin and other pulleys on axles carried by the slide plate, and the cable extending around the different pulleys and having its opposite ends operably connected with the tow bar.

5. The carriage described in claim 4, characterized by steering mechanism for the carriage symmetrical about the center pin, the location of the parts of the pulley system being also symmetrical about the center pin whereby operation of the lock releasing actuator is independent of the steering of the carriage.

6. The carriage described in claim 5, characterized by an axle, extending from each steering knuckle, the actuator including a second pulley system connected with the slide plate and symmetrical about the center pin and about the axes of turning of the steering knuckles whereby the release of the means locking the wheel is independent of the steering of the carriage.

7. The carriage described in claim 6, characterized by the steering knuckles at opposite ends of a fixed axle, and a wheel connected with each steering knuckle, and each wheel having a brake for locking it against rotation, the actuator for releasing the brake including a separate pulley system for each of said wheels in addition to said second pulley system.

8. A carriage having wheels by which it is supported, a tow bar at one end of the carriage, a connection between the tow bar and the carriage, brake means on each wheel responsive to any rotation of the wheel for locking the wheel against further rotation, a lock release device operably connected to the locking means, an actuator including motion-transmitting connections between the tow bar and the lock release device for operating said device in response to force applied to the tow bar there being at least two brakes on each wheel oriented to operate for a different direction of rotation of the wheel, each of the brakes of each wheel having its own connection to said lock release device and responsive to movement of the lock release device in a different direction.

9. The carriage described in claim 8, characterized by lost motion in the connection of the tow bar to the carriage, the actuator for operating the lock release device being connected with the two brakes ahead of the lost motion in connection of the tow bar to the carriage.

10. The carriage described in claim 9, characterized by cams located behind the brakes, a brake drum surface on the wheel, roller tracks secured to the brakes, rollers between the cams and the roller tracks of the brakes, the cams being oriented to force the brakes into locking position when friction of the drum surface against a brake urges the brake and its rollers to move in the direction in which that brake is intended to prevent rotation of the wheel.

11. A carriage including a frame, wheels supporting the frame, a tow bar connected with the frame and having limited movement with respect to the frame both forwardly and rearwardly from a mid-position, two brake assemblies for each wheel including brake-locking elements responsive to rotation of the wheel, said elements of the different brake assemblies of each wheel being oriented in opposite directions for preventing rotation of the wheel in either direction, and brake release means including a different motion-transmitting connection to the different brake assembly of each wheel, each of said motion-transmitting connections being operably connected with the tow bar, the release means for the brake assemblies that stop forward rotation being connected with the tow bar in position to be operated by forward movement on the tow bar and the release means for the brake assemblies that stop rearward rotation being connected with the tow bar in position to be operated by rearward movement of the tow bar.

12. The carriage described in claim 11, characterized by a brake drum surface on each of said wheels, each brake assembly including a brake shoe assembly that has a brake band that bears against the drum surface, cam means that moves the brake band against the drum surface with a locking friction in the event a wheel starts to rotate.

13. The carriage described in claim 12, characterized by roller tracks behind the brake bands, rollers between the tracks and cam means, the rollers of each brake assembly being in a group located one after another along a surface of one of the cam means, an axle for each roller, and a cage to hold the ends of the roller axles of each group.

References Cited by the Examiner

UNITED STATES PATENTS

| | | | |
|---|---|---|---|
| 1,473,718 | 11/23 | Barnette | 188—142 |
| 3,005,640 | 10/61 | Cole | 188—119 X |
| 3,012,638 | 12/61 | Morlik | 188—142 X |

ARTHUR L. LA POINT, *Primary Examiner.*

DUANE A. REGER, *Examiner.*